Figure 1:
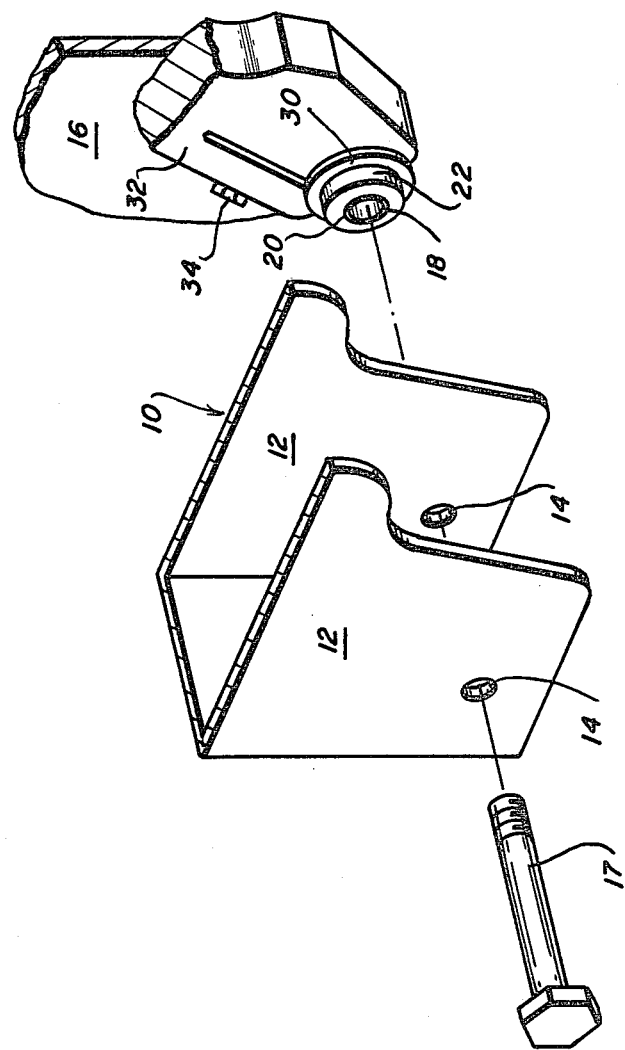
Figure 1:
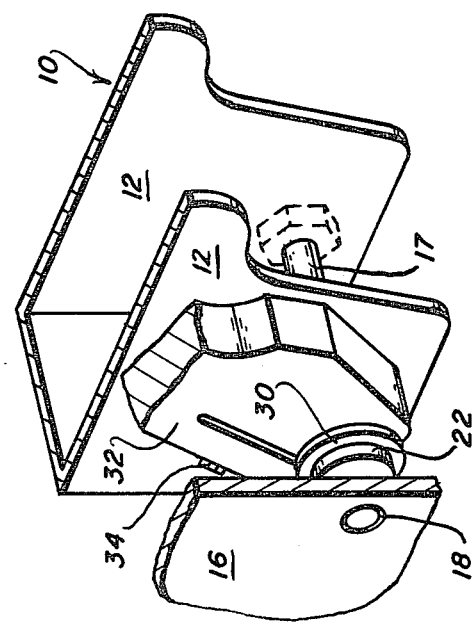

United States Patent [19]

Brunelle

[11] 4,364,604
[45] Dec. 21, 1982

[54] AIRCRAFT SEAT

[75] Inventor: René J. Brunelle, Wolcott, Conn.

[73] Assignee: Kidde, Inc., Clifton, N.J.

[21] Appl. No.: 132,125

[22] Filed: Mar. 20, 1980

Related U.S. Application Data

[63] Continuation-in-part of Ser. No. 42,324, May 25, 1979, abandoned.

[51] Int. Cl.³ .............................................. A47C 7/62
[52] U.S. Cl. .................................. 297/163; 297/191; 297/353; 297/444
[58] Field of Search ............... 297/242, 232, 163, 191, 297/353, 354, 187, 426, 61, 444; 248/291, 293

[56] References Cited

U.S. PATENT DOCUMENTS

| | | | |
|---|---|---|---|
| 2,946,881 | 7/1960 | Pascucci | 248/293 X |
| 3,162,407 | 12/1964 | Yax | 248/291 X |
| 3,316,013 | 4/1967 | Abel et al. | 297/61 X |
| 3,336,076 | 8/1967 | Malitte | 297/163 X |
| 3,653,713 | 4/1972 | Reason | 297/232 |
| 3,773,381 | 11/1973 | Brennan | 297/163 |
| 3,813,147 | 5/1974 | Rick | 297/191 |
| 3,894,496 | 7/1973 | Phillips et al. | 297/135 |
| 4,141,586 | 2/1979 | Goldner et al. | 297/163 |
| 4,159,071 | 6/1979 | Roca | 297/163 |

FOREIGN PATENT DOCUMENTS 808226  1/1959  United Kingdom ............... 297/163

*Primary Examiner*—James T. McCall
*Attorney, Agent, or Firm*—Lyon & Lyon

[57] ABSTRACT

An aircraft seat comprising a pair of pivot pins, a pair of spaced seat back mounting brackets having apertures therein to permit the insertion of the pins therethrough, a pair of side frame forgings, each including a boss, each of the bosses including a peripheral clamping surface and an aperture therein for receiving one of the pins such that the pin and the boss surface have a common axis, a tray assembly including a pair of legs having bifurcated clamp ends for clamping over the peripheral clamping surfaces for selective pivotal motion relative thereto, whereby the tray assembly and the seat back brackets pivot about the common axis, the tray assembly can be removed without removing the seat back mounting brackets, and the seat back mounting brackets may be removed, by removing the pins, without removing the tray assembly.

10 Claims, 2 Drawing Figures

AIRCRAFT SEAT

CROSS REFERENCE TO RELATED APPLICATION

This application is a continuation-in-part of application Ser. No. 042,324, filed May 25, 1979, now abandoned.

The present invention relates to vehicular seats, such as aircraft seats, and particularly to aircraft seats.

Aircraft seats generally include a seat bottom and a seat back mounted for relative pivotal motion therewith. Also mounted for pivotal movement about the same axis is a tray table assembly which fits into suitable openings in the seat back when in its stored position.

Both the seat back and the tray assembly must be releasably secured in operative position so that servicing and/or replacement can occur, but, in the past one of these elements could only be removed after the other one was removed. This is very undesirable.

It is, accordingly, an object of the present invention to provide an aircraft seat, having a seat back and a tray assembly pivotally mounted on a common axis, wherein either can be removed without removing the other.

Other objects and advantages of the present invention will become apparent from the following portion of this specification and from the accompanying drawings which illustrate, in accordance with the mandate of the patent statutes, presently preferred embodiments incorporating the principals of the invention.

Figure 2:
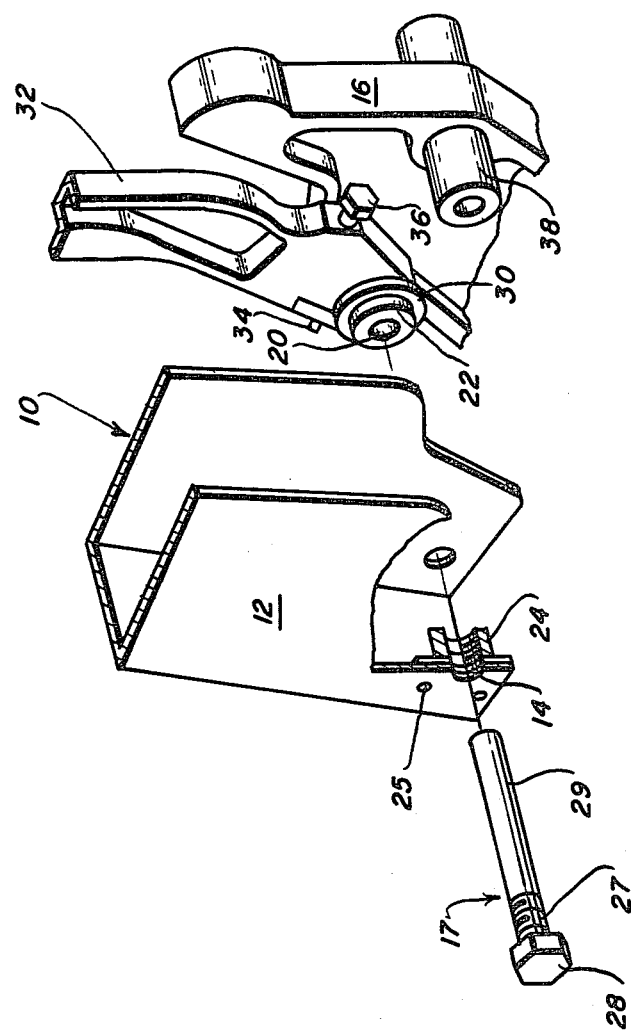
Figure 2:
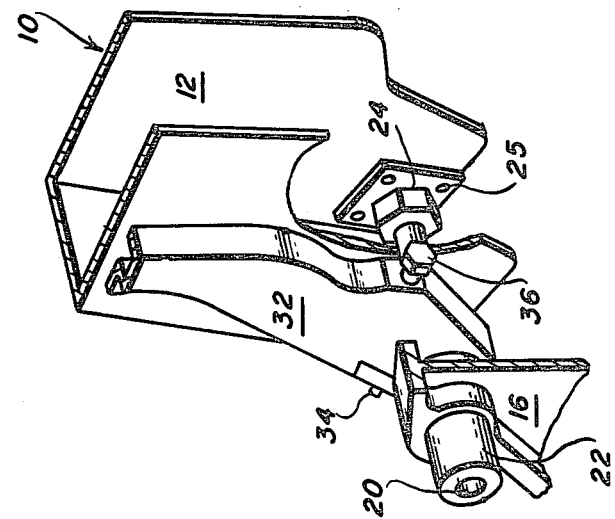

Referring to the drawings:

FIG. 1 is an oblique view of a seat back mounting assembly made in accordance with the teachings of the present invention having a first preferred embodiment; and FIG. 2 is an oblique view of a seat back mounting assembly made in accordacne with the teachings of the present invention having a second preferred embodiment.

The aircraft seat back includes a pair of integrally formed spaced support brackets 10, each of which is in the form of a channel having side walls 12 with apertures 14 therein. These support brackets are mounted to the side frame forgings 16 of the seat by means of pivot pins or bolts 17 which are inserted through the side wall apertures 14 and into bores 20 of a cylindrical concentric boss 22 on the side frame forgings.

To maintain the bolts in the proper axial and operative position pivotally supporting the seat back support brackets, the end of the bolts (FIG. 1) may be threaded for threadedly engaging with threaded or unthreaded bushings 18 which are inserted into the boss bores 20 or the bolts (FIG. 2) can have a threaded portion 27 intermediate the bolt head 28 and non-threaded end 29 with the threaded portion 27 of the bolts threadedly engaging with a nut plate 24 riveted or otherwise secured to each of the seat back brackets 10. The pins or bolts 17, accordingly, function to maintain the seat back between the side frame forgings 16 while serving as a pivot shaft for the seat back.

Maintained around each boss 22 is a plastic sleeve 30 to which the bifurcated end of a tray leg 32 are clamped by tightening screw 34 or the like. The tray assembly and the seat back, accordingly, pivot about the same axis.

An adjustable screw 36 is provided on each tray leg 32 for engagement with a stop 38 to maintain the tray assembly in a selected lowered position.

The seat back can be removed (or installed) by removing (or inserting) the bolts or pins 17. The tray assembly can be removed (or installed) by unclamping (or clamping) the bifurcated ends of the tray legs 32 around the plastic sleeve 30. Thus, both the seat back and the tray assembly may be mounted to the seat frame for pivotal movement about a common axis and each may be removed or installed without disturbing the other.

What is claimed is:

1. An aircraft seat comprising
   a pair of pivot pins,
   a pair of spaced seat back mounting brackets having apertures therein to permit the insertion of said pins therethrough,
   a pair of side frame forgings, each including a boss,
   each of said bosses including a peripheral clamping surface and an aperture therein for receiving one of said pins such that said pin and said boss surface have a common axis,
   a tray assembly including a pair of legs having bifurcated clamp ends for clamping over said peripheral clamping surfaces for selective pivotal motion relative thereto, whereby
   said tray assembly and said seat back brackets pivot about the common axis,
   said tray assembly can be removed without removing said seat back mounting brackets, and
   said seat back mounting brackets may be removed, by removing said pins, without removing said tray assembly.

2. An aircraft seat according to claim 1, further comprising a plastic sleeve concentrically located around each of said boss peripheral clamping surfaces.

3. An aircraft seat according to claim 1, further comprising means to maintain each said bifurcated clamp end selectively clamped over said peripheral surfaces.

4. An aircraft seat comprising
   a pair of spaced seat back mounting brackets,
   a tray assembly including a pair of spaced legs,
   a first support for supporting one of said brackets and one of said legs,
   a second support for supporting the other end of said brackets and the other one of said legs,
   said supports each including
   a post means having first and second selectively separable pieces,
   each said piece having a peripheral surface concentric to a single predetermined axis,
   said legs having bifurcated clamp ends for selectively clamping over said first post piece peripheral surfaces for pivotal rotation relative thereto, and
   said brackets having aperture means therein for receiving said second post pieces therethrough such that said brackets can be mounted on said second post pieces for pivotal rotation about said axis whereby
   said seat back mounting brackets and legs pivot about the same axis,
   said tray assembly can be removed from said support means without removing said brackets and vice versa.

5. An aircraft seat according to claim 4, wherein said supports each comprise a side frame forging wherein said first post piece means comprises a boss protruding from said forging, said boss having a bore concentric to said predetermined axis, and said second post piece means comprises a pivot pin which is inserted in said bore, said pin having an exposed stem which comprises said second post piece peripheral surface.

6. An aircraft seat according to claim 4 or 5, which additionally comprises a plastic sleeve concentrically located around each of said first post piece peripheral surfaces.

7. An aircraft seat according to claim 6, further comprising means for maintaining said clamp ends selectively clamped over said first post piece peripheral surface.

8. An aircraft seat according to claim 1 or 5, further comprising means for maintaining each said pivot pin axialy positioned.

9. An aircraft seat according to claim 8 in which said means for maintaining each pivot pin axially positioned comprises cooperating threaded portions on said pivot pin and a bushing on said side frame forging.

10. An aircraft seat according to claim 8 in which said means for maintaining each said pivot pin axially positioned comprises a threaded portion intermediate the ends of the pivot pin threadedly engaging a nut plate mounted on said seat back mounting bracket.

* * * * *